US012239967B2

(12) United States Patent
Martin et al.

(10) Patent No.: US 12,239,967 B2
(45) Date of Patent: Mar. 4, 2025

(54) SYSTEMS AND METHODS FOR NANOFUNCTIONALIZATION OF POWDERS

(71) Applicant: HRL Laboratories, LLC, Malibu, CA (US)

(72) Inventors: John H. Martin, Oxnard, CA (US); Brennan D. Yahata, Santa Barbara, CA (US); Robert Mone, Stoughton, MA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/243,182

(22) Filed: Sep. 7, 2023

(65) Prior Publication Data

US 2023/0415112 A1    Dec. 28, 2023

Related U.S. Application Data (60) Division of application No. 15/996,439, filed on Jun. 2, 2018, now Pat. No. 11,779,894, which is a (Continued)

(51) Int. Cl.
*B22F 1/054* (2022.01)
*B01F 33/40* (2022.01)
(Continued)

(52) U.S. Cl.
CPC .............. *B01J 3/02* (2013.01); *B01F 33/401* (2022.01); *B01F 35/2213* (2022.01); (Continued)

(58) Field of Classification Search
CPC .. B22F 1/05; B22F 1/052; B22F 1/054; B22F 1/056; B22F 1/102; B22F 1/17; (Continued)

(56) References Cited

U.S. PATENT DOCUMENTS

| 5,305,726 A | 4/1994 | Scharman et al. |
| 5,340,012 A | 8/1994 | Beeferman et al. |

(Continued)

FOREIGN PATENT DOCUMENTS

| GB | 2520191 | * 5/2015 |
| JP | 2011054892 A | 3/2011 |

(Continued)

OTHER PUBLICATIONS

Chen et al., "Rapid control of phase growth by nanoparticles," Nature Communications 5:3879 DOI: 10.1038/ncomms4879.
(Continued)

*Primary Examiner* — Nicholas A Wang
(74) *Attorney, Agent, or Firm* — O'Connor & Company; Ryan P. O'Connor (57) ABSTRACT

Some variations provide a system for producing a functionalized powder, comprising: an agitated pressure vessel; first particles and second particles contained within the agitated pressure vessel; a fluid contained within the agitated pressure vessel; an exhaust line for releasing the fluid from the agitated pressure vessel; and a means for recovering a functionalized powder containing the second particles disposed onto surfaces of the first particles. A preferred fluid is carbon dioxide in liquefied or supercritical form. The carbon dioxide may be initially loaded into the pressure vessel as solid carbon dioxide. The pressure vessel may be batch or continuous and is operated under reaction conditions to functionalize the first particles with the second particles, thereby producing a functionalized powder, such as nanofunctionalized metal particles in which nanoparticles act as grain refiners for a component ultimately produced from the nanofunctionalized metal particles. Methods for making the functionalized powder are also disclosed.

19 Claims, 5 Drawing Sheets

Related U.S. Application Data continuation-in-part of application No. 15/880,474, filed on Jan. 25, 2018, now Pat. No. 11,052,460.

(60) Provisional application No. 62/540,616, filed on Aug. 3, 2017, provisional application No. 62/463,952, filed on Feb. 27, 2017, provisional application No. 62/452,989, filed on Feb. 1, 2017.

(51) Int. Cl.

| | | |
|---|---|---|
| *B01F 35/221* | (2022.01) | |
| *B01F 35/60* | (2022.01) | |
| *B01F 35/71* | (2022.01) | |
| *B01F 35/75* | (2022.01) | |
| *B01J 3/02* | (2006.01) | |
| *B01J 3/04* | (2006.01) | |
| *B22F 1/052* | (2022.01) | |
| *B22F 9/02* | (2006.01) | |
| *B22F 9/04* | (2006.01) | |
| *B22F 1/102* | (2022.01) | |
| *B22F 1/17* | (2022.01) | |
| *B22F 1/18* | (2022.01) | |
| *B82Y 30/00* | (2011.01) | |
| *B82Y 40/00* | (2011.01) | |

(52) U.S. Cl.
CPC .... *B01F 35/2215* (2022.01); *B01F 35/22161* (2022.01); *B01F 35/602* (2022.01); *B01F 35/711* (2022.01); *B01F 35/7543* (2022.01); *B01J 3/04* (2013.01); *B22F 1/052* (2022.01); *B22F 1/054* (2022.01); *B22F 1/056* (2022.01); *B22F 9/02* (2013.01); *B22F 9/04* (2013.01); *B22F 1/102* (2022.01); *B22F 1/17* (2022.01); *B22F 1/18* (2022.01); *B22F 2201/04* (2013.01); *B22F 2201/30* (2013.01); *B22F 2202/01* (2013.01); *B22F 2202/03* (2013.01); *B22F 2202/15* (2013.01); *B22F 2301/052* (2013.01); *B22F 2301/058* (2013.01); *B22F 2301/10* (2013.01); *B22F 2301/15* (2013.01); *B22F 2301/205* (2013.01); *B22F 2301/255* (2013.01); *B22F 2301/30* (2013.01); *B22F 2301/35* (2013.01); *B22F 2301/40* (2013.01); *B22F 2302/05* (2013.01); *B22F 2302/10* (2013.01); *B22F 2302/20* (2013.01); *B22F 2302/256* (2013.01); *B22F 2303/20* (2013.01); *B22F 2998/10* (2013.01); *B22F 2999/00* (2013.01); *B82Y 30/00* (2013.01); *B82Y 40/00* (2013.01)

(58) Field of Classification Search
CPC .... B22F 1/18; B22F 2201/04; B22F 2201/30; B22F 2202/01; B22F 2202/03; B22F 2202/15; B22F 2301/052; B22F 2301/058; B22F 2301/10; B22F 2301/15; B22F 2301/205; B22F 2301/255; B22F 2301/30; B22F 2301/35; B22F 2301/40; B22F 2302/05; B22F 2302/10; B22F 2302/20; B22F 2302/256; B22F 2303/20; B22F 2998/10; B22F 2999/00; B22F 9/02
See application file for complete search history.

(56) References Cited

U.S. PATENT DOCUMENTS

| | | | |
|---|---|---|---|
| 5,462,712 A | 10/1995 | Langan et al. | |
| 5,533,597 A * | 7/1996 | Nezu | B60G 17/08 |
| | | | 280/124.101 |
| 5,698,163 A * | 12/1997 | Mandel | G05D 21/02 |
| | | | 422/111 |
| 5,993,747 A * | 11/1999 | Mandel | B01J 19/0006 |
| | | | 422/111 |
| 6,024,915 A | 2/2000 | Kume et al. | |
| 6,071,628 A | 6/2000 | Seals et al. | |
| 6,254,757 B1 | 7/2001 | Lashmore et al. | |
| 6,368,427 B1 | 4/2002 | Sigworth | |
| 9,238,877 B2 | 1/2016 | Krause et al. | |
| 2002/0136884 A1 | 9/2002 | Oechsner | |
| 2003/0077473 A1 | 4/2003 | Bretschneider et al. | |
| 2003/0104147 A1 | 6/2003 | Bretschneider et al. | |
| 2005/0238528 A1 | 10/2005 | Lin et al. | |
| 2006/0065330 A1 | 3/2006 | Cooper et al. | |
| 2010/0288243 A1 | 11/2010 | Kaburagi et al. | |
| 2012/0135142 A1 | 5/2012 | Yang et al. | |
| 2012/0289559 A1 * | 11/2012 | Niwa | B02C 17/16 |
| | | | 514/420 |
| 2012/0315399 A1 | 12/2012 | Feng et al. | |
| 2013/0012643 A1 | 1/2013 | Monsheimer et al. | |
| 2013/0146041 A1 | 6/2013 | Hijii et al. | |
| 2013/0152739 A1 | 6/2013 | Li et al. | |
| 2015/0252451 A1 | 9/2015 | Al-Aqeeli et al. | |
| 2015/0337423 A1 | 11/2015 | Martin et al. | |
| 2016/0339517 A1 * | 11/2016 | Joshi | B22F 10/28 |
| 2017/0016095 A1 | 1/2017 | Karlen et al. | |
| 2017/0252851 A1 | 9/2017 | Fulop et al. | |

FOREIGN PATENT DOCUMENTS

| | | |
|---|---|---|
| KR | 1020080105250 A | 12/2008 |
| WO | 2005017220 A1 | 2/2005 |

OTHER PUBLICATIONS

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. Nov. 2011, 4166-4174.

Högberg et al., "Reactive sputtering of σ-ZrH2 thin films by high power impulse magnetron sputtering and direct current magnetron sputtering," Journal of Vacuum Science & Technology A 2014, 32, 041510.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials Oct. 2017, 919; doi:10.3390/ma10080919.

Roberts et al., "A novel processing approach for additive manufacturing of commercial aluminum alloys" Physics Procedia 83 ( 2016 ) 909-917.

Martin et al., "3D printing of high-strength aluminium alloys" Nature, vol. 549, Sep. 21, 2017.

International Preliminary Report on Patentability (Chapter II of the Patent Cooperation Treaty), PCT/US2018/035766, dated Sep. 24, 2019, indicating claims 1-34 are patentable.

* cited by examiner

210 — Provide first particles, second particles, and a fluid (e.g., supercritical $CO_2$)

220 — Add the first particles, second particles, and the fluid into an agitated and heated pressure vessel 230 — Dispose second particles onto surfaces of first particles, with effective temperature, pressure, time, and agitation, generating functionalized powder in the pressure vessel

240 — Release the fluid from the pressure vessel and recover the functionalized powder Functionalized powder
(e.g., nanofunctionalized metal particles)

SYSTEMS AND METHODS FOR NANOFUNCTIONALIZATION OF POWDERS

PRIORITY DATA

This patent application is a divisional application of U.S. patent application Ser. No. 15/996,439, filed on Jun. 2, 2018, which claims priority to U.S. Provisional Patent App. No. 62/540,616, filed on Aug. 3, 2017, each of which is hereby incorporated by reference herein. U.S. patent application Ser. No. 15/996,439 is a continuation-in-part application of U.S. Pat. No. 11,052,460, issued on Jul. 6, 2021, which claims priority to U.S. Provisional Patent App. No. 62/452,989, filed on Feb. 1, 2017, and to U.S. Provisional Patent App. No. 62/463,952, filed on Feb. 27, 2017, each of which is hereby incorporated by reference herein.

FIELD OF THE INVENTION

The present invention generally relates to methods and apparatus for functionalizing metal powders or other powders, and functionalized materials produced.

BACKGROUND OF THE INVENTION

The assembly of nanoparticles onto substrates is relevant for a wide variety of applications. There are known coating methods available to deposit nanoparticles. The methods differ by their ability to control particle packing density and layer thickness, the ability to use different particles, and the complexity of the method and instrumentation needed.

Metal-based additive manufacturing, or three-dimensional (3D) printing, has applications in many industries, including the aerospace and automotive industries. Building up metal components layer by layer increases design freedom and manufacturing flexibility, thereby enabling complex geometries while eliminating traditional economy-of-scale constraints. However, currently only a few alloys, the most relevant being AlSi10Mg, TiAl6V4, CoCr, and Inconel 718, can be reliably printed. The vast majority of the more than 5,500 alloys in use today cannot be additively manufactured because the melting and solidification dynamics during the printing process lead to intolerable microstructures with large columnar grains and cracks. 3D-printable metal alloys are limited to those known to be easily weldable. The limitations of the currently printable alloys, especially with respect to specific strength, fatigue life, and fracture toughness, have hindered metal-based additive manufacturing. See Martin et al., "3D printing of high-strength aluminium alloys" Nature vol. 549, pages 365-369, which is hereby incorporated by reference.

In particular, during solidification of many alloys, the primary equilibrium phase solidifies first at a different composition from the bulk liquid. This mechanism results in solute enrichment in the liquid near the solidifying interface, locally changing the equilibrium liquidus temperature and producing an unstable, undercooled condition. As a result, there is a breakdown of the solid-liquid interface leading to cellular or dendritic grain growth with long channels of interdendritic liquid trapped between solidified regions. As temperature and liquid volume fraction decrease, volumetric solidification shrinkage and thermal contraction in these channels produces cavities and hot tearing cracks which may span the entire length of the columnar grain and can propagate through additional intergranular regions.

Fine equiaxed microstructures accommodate strain in the semi-solid state by suppressing coherency that locks the orientation of these solid dendrites and promotes tearing. Producing equiaxed structures requires large amounts of undercooling, which has thus far proven difficult in additive processes where high thermal gradients arise from rastering of a direct energy source in an arbitrary geometric pattern.

What is needed is an approach to control solidification microstructure by promoting nucleation of new grains of metal alloys, such as additively manufactured metal alloys. Use of nanoparticles in additive manufacturing has been described, but uniformity and scale-up have been difficult. Systems (apparatus) and methods to incorporate nanoparticles into metal or metal alloy powders are desired.

SUMMARY OF THE INVENTION

The present invention addresses the aforementioned needs in the art, as will now be summarized and then further described in detail below.

Some variations of the invention provide a system for producing a functionalized powder, the system comprising:
(a) an agitated pressure vessel;
(b) a thermal-control unit (e.g., a heater) disposed in thermal communication with the agitated pressure vessel;
(c) a plurality of first particles contained within the agitated pressure vessel;
(d) a plurality of second particles contained within the agitated pressure vessel;
(e) a fluid contained within the agitated pressure vessel;
(f) an exhaust line for releasing the fluid from the agitated pressure vessel; and
(g) a means for recovering a functionalized powder containing the second particles disposed onto surfaces of the first particles.

In some embodiments, the fluid is a non-flammable fluid. The fluid may be a liquid, a gas, or a combination thereof.

In various embodiments, the fluid is selected from the group consisting of carbon dioxide, nitrous oxide, $C_1$-$C_4$ hydrocarbons (e.g., methane, ethane, ethylene, propane, propylene, or n-butane), $C_1$-$C_4$ oxygenates (e.g., methanol, ethanol, or acetone), and combinations thereof.

In some embodiments, the fluid includes or consists essentially of carbon dioxide ($CO_2$). The carbon dioxide may be in a vapor state within the agitated pressure vessel. Alternatively, or additionally, the carbon dioxide may be in a liquid state within the agitated pressure vessel. In certain embodiments, the carbon dioxide is in a supercritical state within the agitated pressure vessel. When the fluid includes carbon dioxide, the system optionally comprises a means for introducing solid carbon dioxide into the agitated pressure vessel.

In some embodiments, the exhaust line includes a filter to capture the first particles, the second particles, and/or the functionalized powder.

In some embodiments, the system further comprises a safety release line that is activated when the pressure within the agitated pressure vessel reaches a predetermined pressure, such as 200 bar.

The system may further comprise a separate container disposed in flow communication with the exhaust line, for receiving fluid released from the agitated pressure vessel. The separate container may be a drum filled with water or oil, for example.

The system preferably includes a control subsystem for adjusting temperature, pressure, residence time, and/or agitation within the agitated pressure vessel.

The system may be a batch apparatus, a continuous apparatus, a semi-continuous apparatus, or a combination thereof.

In some embodiments, the first particles are selected from the group consisting of metal particles, intermetallic particles, ceramic particles, and combinations thereof. For example, the first particles may contain one or more metals selected from the group consisting of aluminum, iron, nickel, copper, titanium, magnesium, zinc, silicon, lithium, silver, chromium, manganese, vanadium, bismuth, gallium, lead, and combinations thereof. The first particles may have an average first-particle size from about 1 micron to about 1 millimeter, for example.

In some embodiments, the second particles are selected from the group consisting of metal particles, intermetallic particles, ceramic particles, and combinations thereof. For example, the second particles may contain one or more elements selected from the group consisting of zirconium, tantalum, niobium, titanium, and oxides, nitrides, hydrides, carbides, or borides thereof, and combinations of the foregoing. The second particles may have an average second-particle size from about 1 nanometer to about 100 microns, for example.

In certain embodiments of the invention, the recovered functionalized powder is a nanofunctionalized metal powder.

Other variations of the invention provide a system for producing a functionalized powder, wherein the system does not (yet) physically contain the first particles, the second particles, and/or the fluid, the system comprising:

(a) an agitated pressure vessel;
(b) a thermal-control unit (e.g., a heater) disposed in thermal communication with the agitated pressure vessel;
(c) a means for introducing a plurality of first particles into the agitated pressure vessel, such as by adding the first particles to a batch vessel, or pumping the first particles into continuous vessel;
(d) a means for introducing a plurality of second particles into the agitated pressure vessel, such as by adding the second particles to a batch vessel, or pumping the second particles into continuous vessel, with or separate from the first particles;
(e) a means for introducing a fluid into the agitated pressure vessel, such as by adding the fluid directly to the pressure vessel or by introducing a fluid precursor (e.g., solid $CO_2$) into the pressure vessel;
(f) an exhaust line for releasing the fluid from the agitated pressure vessel, wherein the release may be continuous, intermittent, or triggered at a predetermined pressure, for example; and
(g) a means for recovering a functionalized powder containing the second particles disposed onto surfaces of the first particles, wherein the recovering may include isolating from a batch vessel, or pumping out of a continuous vessel, for example.

Some variations of the invention provide a method for producing a functionalized powder, the method comprising:
introducing a plurality of first particles into an agitated pressure vessel;
introducing a plurality of second particles into the agitated pressure vessel;
introducing a fluid into the agitated pressure vessel, wherein the fluid dissolves or suspends at least one of the first particles or the second particles;
in the agitated pressure vessel, reacting the second particles with the first particles to generate a functionalized powder containing the second particles disposed onto surfaces of the first particles;
releasing the fluid from the agitated pressure vessel; and
recovering the functionalized powder from the agitated pressure vessel.

In some methods, the fluid is selected from the group consisting of carbon dioxide, nitrous oxide, $C_1$-$C_4$ hydrocarbons, $C_1$-$C_4$ oxygenates, and combinations thereof.

In some embodiments, the fluid includes carbon dioxide in a vapor state and/or a liquid state within the agitated pressure vessel. In certain embodiments, the fluid includes carbon dioxide in a supercritical state within the agitated pressure vessel.

Optionally, solid carbon dioxide may be introduced into the agitated pressure vessel. The solid carbon dioxide melts within the agitated pressure vessel to form carbon dioxide in vapor form and/or liquid form. During reactor operation, the $CO_2$ may be in vapor, liquid, and/or supercritical form, but should not be primarily in solid form.

In some embodiments, the reaction for reacting the second particles with the first particles is conducted at a reaction temperature from about 10° C. to about 200° C. In these or other embodiments, the reaction is conducted at a reaction pressure from about 2 bar to about 200 bar. The reaction may be conducted for a reaction time from about 10 minutes to about 50 hours, for example.

In some embodiments, the method is operated in batch. In other embodiments, the method is operated continuously or semi-continuously.

In some methods, the first particles are selected from the group consisting of metal particles, intermetallic particles, ceramic particles, and combinations thereof.

In certain methods, the first particles contain one or more metals selected from the group consisting of aluminum, iron, nickel, copper, titanium, magnesium, zinc, silicon, lithium, silver, chromium, manganese, vanadium, bismuth, gallium, lead, and combinations thereof.

In some methods, the second particles are selected from the group consisting of metal particles, intermetallic particles, ceramic particles, and combinations thereof.

In certain methods, the second particles contain one or more elements selected from the group consisting of zirconium, tantalum, niobium, titanium, and oxides, nitrides, hydrides, carbides, or borides thereof, and combinations of the foregoing.

DETAILED DESCRIPTION OF EMBODIMENTS OF THE INVENTION

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention is premised on scalable and cost-effective systems for powder functionalization without requiring flammable solvents. The functionalized powders may be used in additive manufacturing or as raw materials in other applications that can benefit from powder functionalization.

Some variations of the invention provide a system for producing a functionalized powder, the system comprising:
(a) an agitated pressure vessel;
(b) a thermal-control unit, such as a heater, disposed in thermal communication with the agitated pressure vessel;
(c) a plurality of first particles contained within the agitated pressure vessel;
(d) a plurality of second particles contained within the agitated pressure vessel;
(e) a fluid contained within the agitated pressure vessel;
(f) an exhaust line for releasing the fluid from the agitated pressure vessel; and
(g) a means for recovering a functionalized powder containing the second particles disposed onto surfaces of the first particles.

The choice of fluid(s) will depend on compatibility of fluid with the first and second particles. In some embodiments, the fluid dissolves or suspends at least one of the components. Van der Waals forces, chemical bonds, physical adsorption, or other forces may cause the second particles to be retained on surfaces of the first particles. The fluid may have a lower surface energy than the first particles, the second particles, or both of these. When this fluid is released from a mixture of first and second particles, the latter may be drawn by capillary forces to surfaces of first particles, in some embodiments.

The fluid may be a liquid, a gas, or a combination thereof. In various embodiments, the fluid is selected from the group consisting of carbon dioxide ($CO_2$) nitrous oxide ($N_2O$), $C_1$-$C_4$ hydrocarbons (e.g., methane, ethane, ethylene, propane, propylene, or n-butane), $C_1$-$C_4$ oxygenates (e.g., methanol, ethanol, or acetone), and combinations thereof. For purposes of this disclosure, derivatives of hydrocarbons or oxygenates, in which one or more hydrogen atoms are replaced by other elements or functional groups, are included. For example, replacing each H atom with a Cl atom in methane results in carbon tetrachloride ($CCl_4$), which may be used as a fluid, in certain embodiments.

In some embodiments, the fluid is a non-flammable fluid. A "non-flammable fluid" as meant herein is a fluid that does not combust in air at atmospheric pressure. Exemplary non-flammable fluids are $CO_2$, $N_2O$, and $CCl_4$. In some embodiments, an ordinarily flammable substance (such as propane) is made to be non-flammable in a mixture with diluent gas, such as Ar or $N_2$.

In some embodiments, the fluid includes or consists essentially of carbon dioxide. The carbon dioxide may be in a vapor state within the agitated pressure vessel. Alternatively, or additionally, the carbon dioxide may be in a liquid state within the agitated pressure vessel. In certain embodiments, the carbon dioxide is in a supercritical state within the agitated pressure vessel. When the fluid includes carbon dioxide, the system optionally comprises a means for introducing solid carbon dioxide (also known as dry ice) into the agitated pressure vessel.

Employing a liquefied or supercritical $CO_2$ solution of particles allows mixing of the powder particles, with the benefit of not requiring a flammable solvent (i.e., mixing is conducted in an atmosphere incapable of igniting). After functionalization, the $CO_2$ may be vented off quickly and recycled, thereby eliminating waste while also drying the powder. Following removal of liquefied or supercritical $CO_2$, Van der Waals forces, chemical bonds, physical adsorption, or other forces may cause the nanoparticles to be retained on surfaces of the powder particles.

The agitated pressure vessel is operated under effective reaction conditions to dispose the second particles onto surfaces of the first particles, regardless of mechanism. The effective reaction conditions include selection of temperature, pressure, residence time (i.e., reaction time), and agitation, or ranges of such parameters, such that the desired powder functionalization takes place at least to some extent.

Effective temperatures may range from about 10° C. to about 200° C., such as from about 25° C. to about 100° C., e.g. about 30° C., 35° C., 40° C., 50° C., 60° C., 70° C., or 90° C. When the desired reaction temperature is relatively low, such as about or less, the thermal-control unit may be omitted. The thermal-control unit may be a heater, which may be provided in various forms such as (but not limited to) hot oil, steam jacket, heat tape, or an oven, for example. The thermal-control unit may be a combined heater/cooler or a heat-transfer medium that enables the reactor to be maintained at a desired temperature.

Effective pressures may range from about 2 bar to about 200 bar, such as from about 10, 20, 30, 40, 50, 60, 70, 80, 90, or 100 bar.

Effective residence times may range from about 1 minute to about 100 hours, such as from about 10 minutes to about 50 hours, e.g. about 0.5, 1, 2, 3, 4, 5, 6, 7, 8, 9, 10, 15, 20, or 25 hours.

Selection of temperature and pressure will generally depend on choice of fluid, and one skilled in the art can consult the phase diagram of the selected fluid so that the fluid, during particle functionalization, remains in the desired phase(s) such as a liquid phase or the supercritical phase. Selection of time will generally depend on the nature of the first and second particles and the kinetics associated with functionalization, which depends on selected temperature and pressure. There is therefore an interrelationship among time, temperature, and pressure, as is common with chemical reactions.

The pressure vessel may be agitated in a variety of ways. In some embodiments, the pressure vessel is disposed in physical communication with an external vibrating motor that physically vibrates the pressure vessel to mix the contents. In some embodiments, the pressure vessel is configured with a stirring mechanism such as an internal impeller or paddle. In some embodiments, the pressure vessel is agitated by rolling or tumbling the pressure vessel in an automated manner within the overall system. In some embodiments, the pressure vessel is agitated via continuous recycling of fluid that is pumped out of and back into the pressure vessel. For example, a continuous purge of fluid may be taken from the pressure vessel, separate from or integrated with the exhaust line, from the top and reinjected into the bottom of the pressure vessel to enhance the mixing efficiency. In similar embodiments, continuous recirculation of an inert gas (such as Ar or $N_2$) through the pressure vessel may be employed to enhance the mixing efficiency. Combinations of any of these agitation techniques, or others (e.g., sonication), may be employed in certain embodiments.

Effective agitation ranges may vary and may be characterized by an output associated with the selected agitation means. For example, in the case of an external vibrating motor, the vibration frequency may be monitored or controlled. In the case of an internal impeller, the impeller revolution frequency (e.g., revolutions per minute, rpm) may be monitored or controlled. In the case of a continuous purge and reinjection of fluid or another gas, the recycle flow rate may be monitored or controlled, and so on.

For any type of agitation, the fluid Reynolds Number (Re) may be monitored, estimated, or controlled, such as by use of tracers to measure velocity distribution within the pressure vessel. The Re may be based on the vessel diameter or on the impeller diameter in the case of an internal impeller, for example. In various embodiments, an effective internal Re may be from about 100 to about 10,000, such as from about 1,000 to about 5,000. The flow pattern within the pressure vessel may be laminar or turbulent.

The specific agitation rate is not regarded as critical to the invention, and one skilled in the art will be able to employ an effective agitation rate. While a non-agitated pressure vessel (Re=0) may in principle be employed, it is not preferred due to the heat-transfer and mass-transfer limitations arising from lack of agitation. This can potentially be overcome by excessively long residence times to allow the necessary particle diffusion, but that leads to larger vessels and higher costs.

The system preferably includes a reactor control subsystem for adjusting temperature, pressure, residence time, and/or agitation within the agitated pressure vessel. A reactor control subsystem may be configured to vary parameters during reaction, such as over a prescribed protocol, or in response to measured variables. For example, an unintended change in vessel pressure may be compensated by a change in vessel temperature and/or residence time. As another example, temperature may be maintained constant (isothermal operation) or pressure may be maintained constant (isobaric operation). The reactor control subsystem may utilize well-known control logic principles, such as feedback control and feedforward control. Control logic may incorporate results from previous experiments or production campaigns. One example of a reactor control subsystem is MasterLogic Programmable Logic Controller from Honeywell (Morris Plains, New Jersey, U.S.).

After the desired reactive functionalization has taken place, the pressure within the pressure vessel may be reduced or fully released (i.e. down to atmospheric pressure) by opening a valve to allow the fluid to exit out the exhaust line. The pressure vessel may be opened and the functionalized powder may be allowed to dry before recovery from the vessel. In some embodiments, an inert gas is swept through the vessel following such pressure release, to assist in drying by removing residual fluid, for example. Alternatively, or additionally, the functionalized powder may be recovered from the pressure vessel and introduced into a separate unit for drying or other treatment. In some embodiments, such as when the system is continuous or when automated batch production is desired, the pressure vessel may be configured with a large valve and optionally a bottom scraper or other means to recover the functionalized powder from the pressure vessel.

The system may further comprise a separate container disposed in flow communication with the exhaust line, for receiving fluid released from the agitated pressure vessel. The separate container may be a drum filled with water or oil, for example.

Particles or functionalized powder preferably should not be allowed to flow to the separate container. Depending on the specific system design, particles and functionalized powder may end up in the exhaust line. In some embodiments, the exhaust line includes a filter to capture the first particles, the second particles, and/or the functionalized powder. The filter may be designed to remove particles that are at least the size of nanoparticles, at least the size of microparticles, or some other filter size. In other embodiments, a centrifuge or other separation means is utilized in the exhaust line, to recover the filtered solid material. The recovered solid material (e.g., from filtering, centrifuging, or other means) may then be returned to the pressure vessel, either continuously or intermittently, or discarded.

In some embodiments, the system further comprises a safety release line that is activated when the pressure within the agitated pressure vessel reaches or exceeds a predetermined pressure, such as a pressure selected from 25 bar to 300 bar (e.g., 200 bar) that is higher than the desired reaction pressure within the pressure vessel.

Other safety considerations may be applied to the system. The reactor control subsystem mentioned above may include protective devices that automatically shut down the operation, when the temperature or pressure exceeds a maximum value. Practical safety-related design may be built into the system as well. For example, the entire pressure vessel may be disposed within a sand bath contained in a suitable container. Those skilled in the art will understand how to design safe pressure vessels and systems employing them.

The volume of the pressure vessel may vary widely, such as (but not limited to) from about 0.1 liter to about 1,000 liters, e.g. from about 1 liter to about 100 liters.

Figure 1:
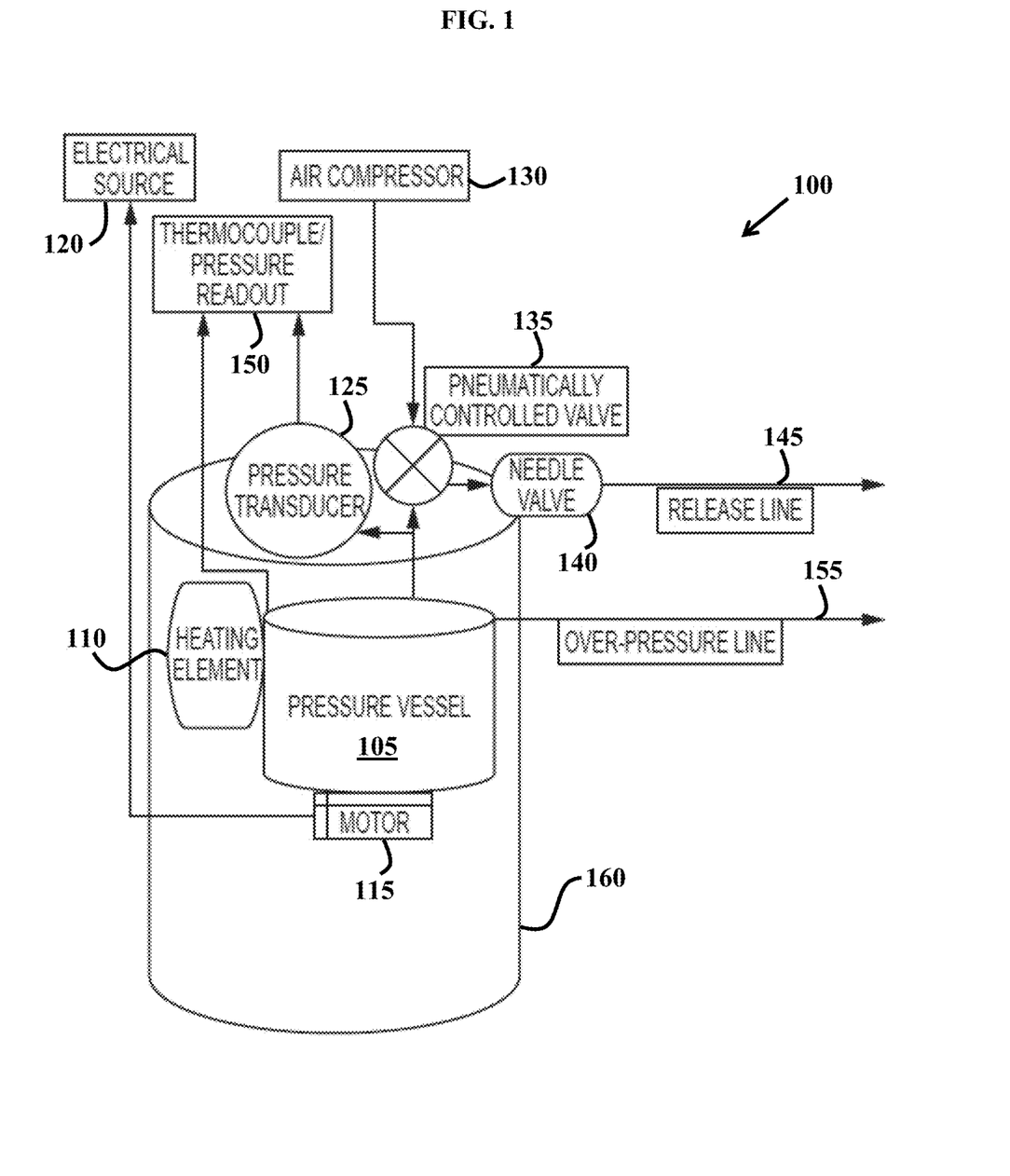
FIG. 1 is an exemplary system to produce nanofunctionalized metal powder, in some embodiments of the invention.

The system may be a batch apparatus, a continuous apparatus, a semi-continuous apparatus, or a combination thereof. A batch apparatus includes a batch reactor, such as a pressure vessel. An example of a pressure vessel as a batch reactor is depicted in FIG. 1, further discussed below. A continuous apparatus includes a high-pressure reactor configured for a continuous feed of first and second particles and a continuous feed of fluid. The high-pressure reactor may be a tank or vessel in which the particles and fluid are continuously stirred, or a tubular reactor in which the particles and fluid are in plug flow (which is well-mixed, i.e. agitated, in the radial direction), or an intermediate mixing pattern between these extremes. A continuous high-pressure reactor may be horizontal or vertical, and may be configured for cocurrent flow of particles and fluid, or countercurrent flow of particles and fluid, or countercurrent flow of fluid and first particles against flow of second particles, and so on. An example of a semi-continuous apparatus is the batch apparatus of FIG. 1 modified for continuous recirculating flow of fluid, or a continuously stirred tank with intermittent feed of particles and/or intermittent release of fluid, for example.

In some embodiments, the first particles are selected from the group consisting of metal particles, intermetallic particles, ceramic particles, and combinations thereof. For example, the first particles may contain one or more metals selected from the group consisting of aluminum, iron, nickel, copper, titanium, magnesium, zinc, silicon, lithium, silver, chromium, manganese, vanadium, bismuth, gallium, lead, and combinations thereof.

The first particles may have an average first-particle size from about 1 micron to about 1 millimeter, for example. In various embodiments, the first particles have an average first-particle size of about 1, 2, 5, 10, 25, 50, 100, 200, 300, 400, 500, 600, 700, 800, or 900 microns.

In some embodiments, the second particles are selected from the group consisting of metal particles, intermetallic particles, ceramic particles, and combinations thereof. For example, the second particles may contain one or more elements selected from the group consisting of zirconium, tantalum, niobium, titanium, and oxides, nitrides, hydrides, carbides, or borides thereof, and combinations of the foregoing.

The second particles may have an average second-particle size from about 1 nanometer to about 100 microns, for example. In various embodiments, the second particles have an average second-particle size of about 1, 2, 5, 10, 25, 50, 100, 200, 300, 400, 500, 600, 700, 800, or 900 nanometers, or about 1, 2, 5, 10, 20, 30, 40, 50, or 75 microns.

In certain embodiments of the invention, the recovered functionalized powder is a nanofunctionalized metal powder. In a nanofunctionalized metal powder, the average second-particle size is 1000 nanometers or less.

Other variations of the invention provide a system for producing a functionalized powder, wherein the system does not (yet) physically contain the first particles, the second particles, and/or the fluid, the system comprising:
 (a) an agitated pressure vessel;
 (b) a thermal-control unit disposed in thermal communication with the agitated pressure vessel;
 (c) a means for introducing a plurality of first particles into the agitated pressure vessel, such as by adding the first particles to a batch vessel, or pumping the first particles into continuous vessel;
 (d) a means for introducing a plurality of second particles into the agitated pressure vessel, such as by adding the second particles to a batch vessel, or pumping the second particles into continuous vessel, with or separate from the first particles;
 (e) a means for introducing a fluid into the agitated pressure vessel, such as by adding the fluid directly to the pressure vessel or by introducing a fluid precursor (e.g., inserting solid $CO_2$ prior to starting the reaction) into the pressure vessel;
 (f) an exhaust line for releasing the fluid from the agitated pressure vessel, wherein the release may be continuous, intermittent, or triggered at a predetermined pressure, for example; and
 (g) a means for recovering a functionalized powder containing the second particles disposed onto surfaces of the first particles, wherein the means for recovering may include isolating from a batch vessel, or pumping out of a continuous vessel, for example.

The following description, with reference to FIG. 1, is an exemplary system for producing a functionalized powder. This design can be adapted using known chemical-engineering principles to any scale system for continued production of larger volumes of functionalized powders. The example system of FIG. 1 is capable of containing a controlled volume of carbon dioxide above its critical point, and is capable of safely immersing metal powders in a supercritical carbon dioxide environment.

FIG. 1 is a process-flow diagram of a particle functionalization system 100. A pressure vessel 105 may be a metal vessel manufactured by Parr Instrument Company (Moline, Illinois, US) with an interior volume of 1 liter. The pressure vessel 105 is disposed within an outer container 160, in some embodiments. System 100 is a closed environment to avoid the unintended escape of particles from the system.

During functionalization, the pressure vessel 105 contains metal powders as the first particles, and metal or non-metal nanopowders as the second particles. The selected fluid is carbon dioxide, in this example. The carbon dioxide, metal powder, and nanopowder may be enclosed in the pressure vessel 105 in a batchwise manner, i.e. prior to closing up the pressure vessel 105 for operation.

The carbon dioxide may be sealed in the pressure vessel 105 in its solid state, along with packing the particles into the pressure vessel 105. The packing may be done in an inert atmosphere, such as with argon or nitrogen. The solid carbon dioxide undergoes sublimation to form $CO_2$ gas, prior to operation of the pressure vessel. Depending on the time to begin operation, some of the solid $CO_2$ may melt into liquid $CO_2$ or convert to supercritical $CO_2$ without first sublimating into vapor. Regardless of the form of $CO_2$ added to the pressure vessel 105, the temperature and pressure during functionalization will dictate the phase(s) of $CO_2$ present in the pressure vessel 105. Depending on the loading of carbon dioxide, the volume occupied by metal powder, and the amount of heating, the carbon dioxide in situ may be in its liquid, gas, or supercritical regime, which may be predicted by an appropriate equation of state dependent upon the instantaneous temperature and pressure.

The pressure vessel 105 is attached to a heating element 110. The heating element 110 (e.g., heat tape) is monitored by a thermocouple 150 to bring the vessel 105 to a desired temperature, while a pressure transducer 125 monitors the internal vessel pressure. The pressure vessel 105 may be insulated to maintain adiabatic operation or at least minimize heat losses. External cooling of the pressure vessel 105 may be employed in certain embodiments in which functionalization is exothermic, to help control reaction temperature.

A vibrating motor 115 is directly attached to the surface of the vessel 105 to provide adequate mixing of the metal powder and nanopowder within the carbon dioxide environment. The motor 115 is attached to electrical source 120 to drive the motor 115. Instead of vibration, or in addition, the vessel 105 may be agitated by other known agitation means such as stirring, rolling, tumbling, etc.

The pressure vessel 105 of FIG. 1 includes a general inlet/outlet at the top of the vessel. The general inlet/outlet is directly attached to a pressure transducer 125, which has an electrical readout of 0-5 VDC to be calibrated and used in LabVIEW (National Instruments Corporation, Austin, Texas, U.S.), for example. The pressure transducer 125 is in line with a pneumatically controlled valve 135, which will open such as when 5-15 bar air pressure is applied to its actuator. The actuator may be controlled remotely by an air compressor 130. When the pneumatically controlled valve 135 is opened, a partially opened needle valve 140 restricts the flow rate of fluid out of the system. A flexible stainless steel braided hose may make this connection.

The pneumatically controlled valve 135 keeps the vessel release line 145 closed during standard operation. Upon completed functionalization, or when desired by an operator, the valve 135 may be opened remotely by applying a change in pressure. The flow of the fluid and particles through the release line 145 may be limited by the needle valve 140. The released fluid, $CO_2$ in this example, may be fed via release line 145 into a drum of water or another container (not shown). An over-pressure line 155 may be routed to the same drum of water or other container, or otherwise purged from the system.

The over-pressure line 155 is primarily for safety and is not normally in operation. In some embodiments, an over-pressure rupture disk or an automated pressure-relief valve is disposed in flow communication with an orifice of the pressure vessel. The over-pressure rupture disk or automated pressure-relief valve may be connected to a line that leads to the same container (e.g., 55-gallon drum of water) that receives the fluid release line. The over-pressure rupture disk or automated pressure-relief valve may be configured to burst or release at any desired pressure, such as a pressure selected from 100-300 bar (e.g., 200 bar). For further safety precaution, the entire vessel 105 may be submerged in a 55-gallon drum filled with sand, as the outer container 160, for example. A sand drum 160 is also for safety and may be omitted when the pressure vessel 105 is properly prevented from explosion.

Some variations of the invention provide a method for producing a functionalized powder, the method comprising:
 introducing a plurality of first particles into an agitated pressure vessel;
 introducing a plurality of second particles into the agitated pressure vessel;
 introducing a fluid into the agitated pressure vessel, wherein the fluid dissolves or suspends at least one of the first particles or the second particles;
 in the agitated pressure vessel, reacting the second particles with the first particles to generate a functionalized powder containing the second particles disposed onto surfaces of the first particles;
 releasing the fluid from the agitated pressure vessel; and
 recovering the functionalized powder from the agitated pressure vessel.

In some methods, the fluid is selected from the group consisting of carbon dioxide, nitrous oxide, $C_1$-$C_4$ hydrocarbons, $C_1$-$C_4$ oxygenates, and combinations thereof.

In some embodiments, the fluid includes carbon dioxide in a vapor state and/or a liquid state within the agitated pressure vessel. In certain embodiments, the fluid includes carbon dioxide in a supercritical state within the agitated pressure vessel.

Optionally, solid carbon dioxide may be introduced into the agitated pressure vessel. The solid carbon dioxide melts within the agitated pressure vessel to form carbon dioxide in vapor form and/or liquid form. During reactor operation, the $CO_2$ may be in vapor, liquid, and/or supercritical form, but should not be primarily in solid form.

In some embodiments, the reaction for reacting the second particles with the first particles is conducted at a reaction temperature from about 10° C. to about 200° C. In these or other embodiments, the reaction is conducted at a reaction pressure from about 2 bar to about 200 bar. The reaction may be conducted for a reaction time from about 10 minutes to about 50 hours, for example.

In some embodiments, the method is operated in batch. In other embodiments, the method is operated continuously or semi-continuously.

In some methods, the first particles are selected from the group consisting of metal particles, intermetallic particles, ceramic particles, and combinations thereof. In certain methods, the first particles contain one or more metals selected from the group consisting of aluminum, iron, nickel, copper, titanium, magnesium, zinc, silicon, lithium, silver, chromium, manganese, vanadium, bismuth, gallium, lead, and combinations thereof.

In some methods, the second particles are selected from the group consisting of metal particles, intermetallic particles, ceramic particles, and combinations thereof. In certain methods, the second particles contain one or more elements selected from the group consisting of zirconium, tantalum, niobium, titanium, and oxides, nitrides, hydrides, carbides, or borides thereof, and combinations of the foregoing.

Figure 2:
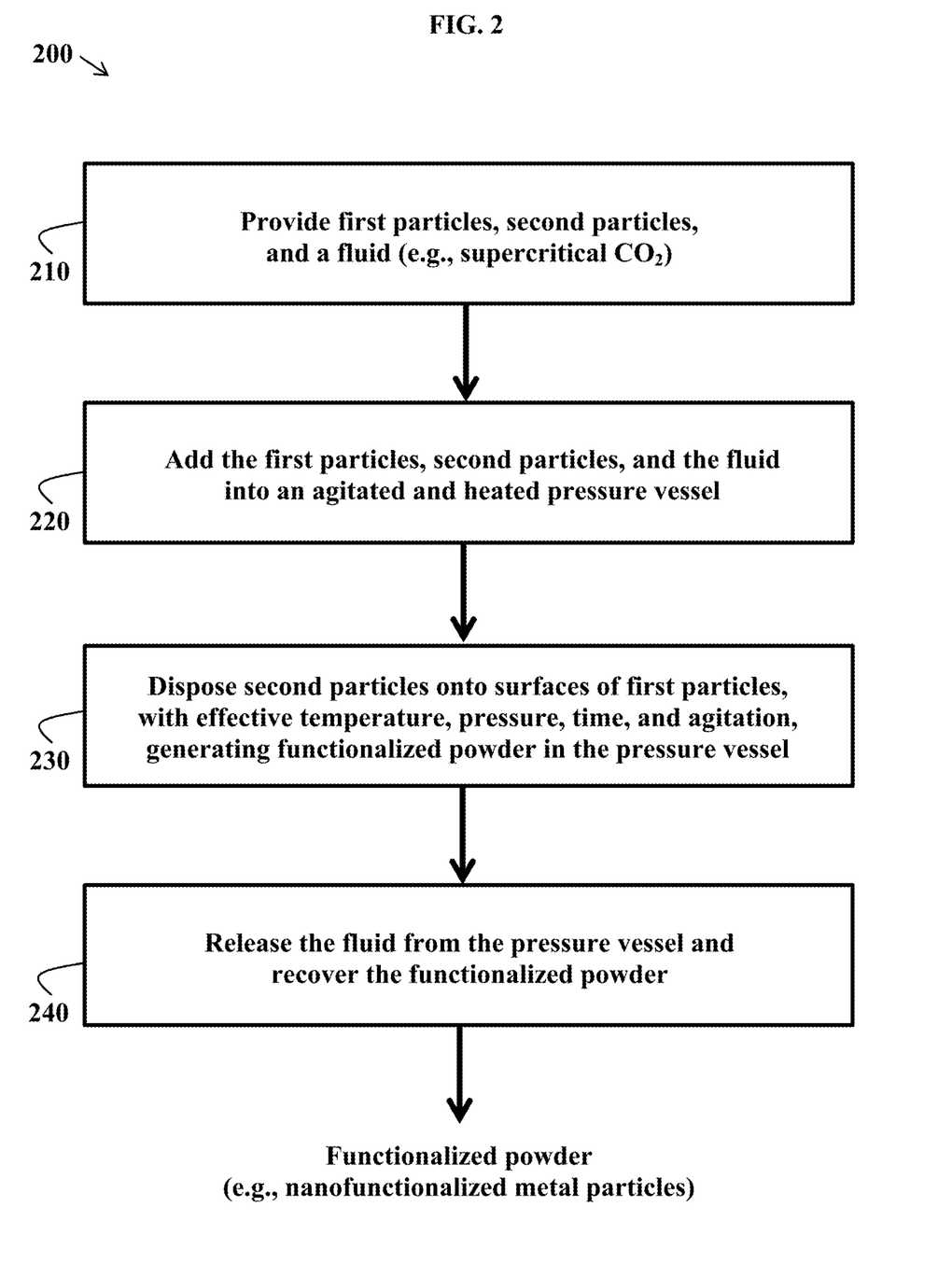
FIG. 2 is a flowchart for an exemplary method of using the system of FIG. 1 to produce a nanofunctionalized metal powder, in some embodiments.

FIG. 2 is a flowchart for an exemplary method of using the system of FIG. 1 to produce a functionalized powder, in some embodiments. The system of FIG. 1 may be operated according to the method of FIG. 2. The system of FIG. 1 and the method of FIG. 2 are suitable for producing the exemplary functionalized metal powders shown in FIGS. 3, 4, and/or 5.

Figure 3:
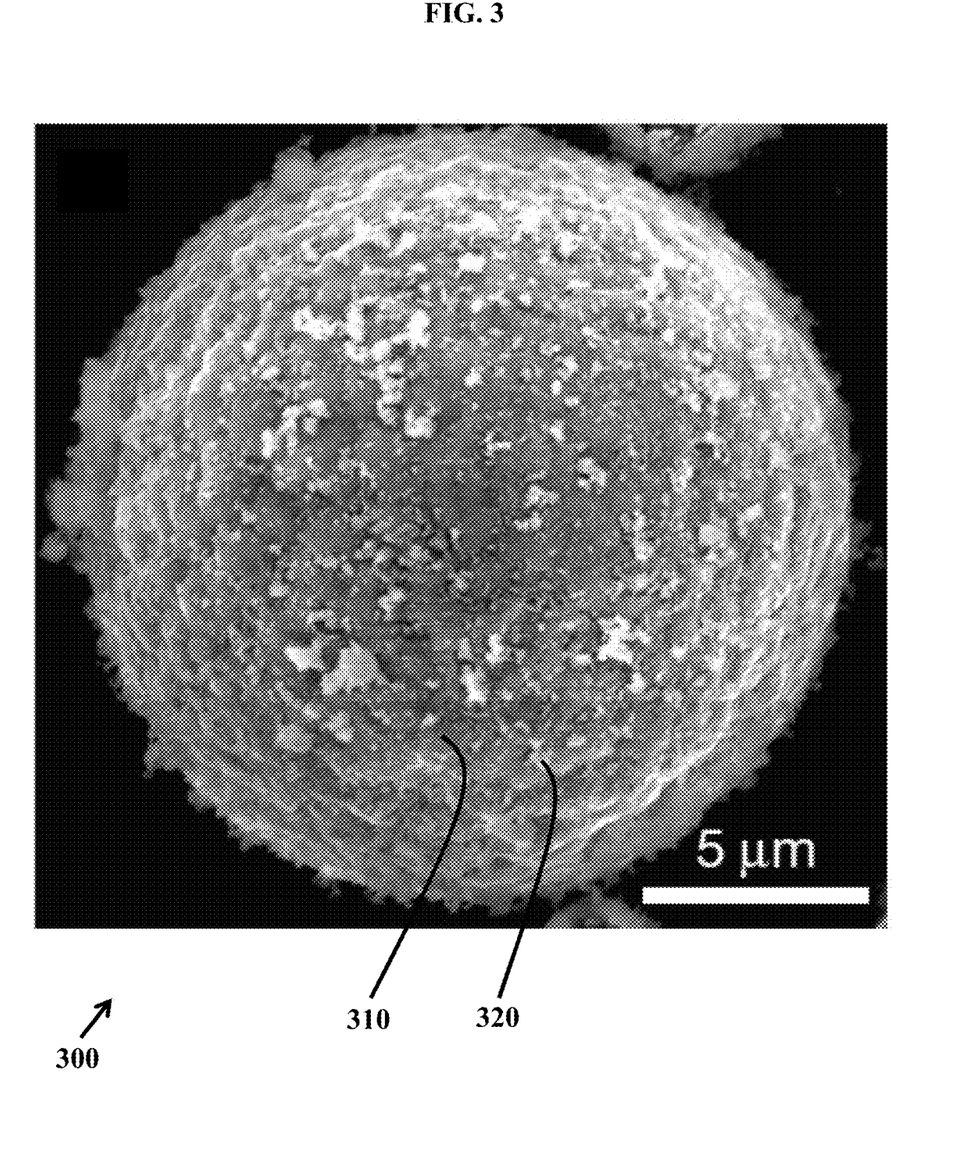
FIG. 3 is a scanning electron microscopy (SEM) image of Al 7075 powder nanofunctionalized with $TiB_2$ nanoparticles (scale bar 5 μm), in some embodiments.
Figure 4:
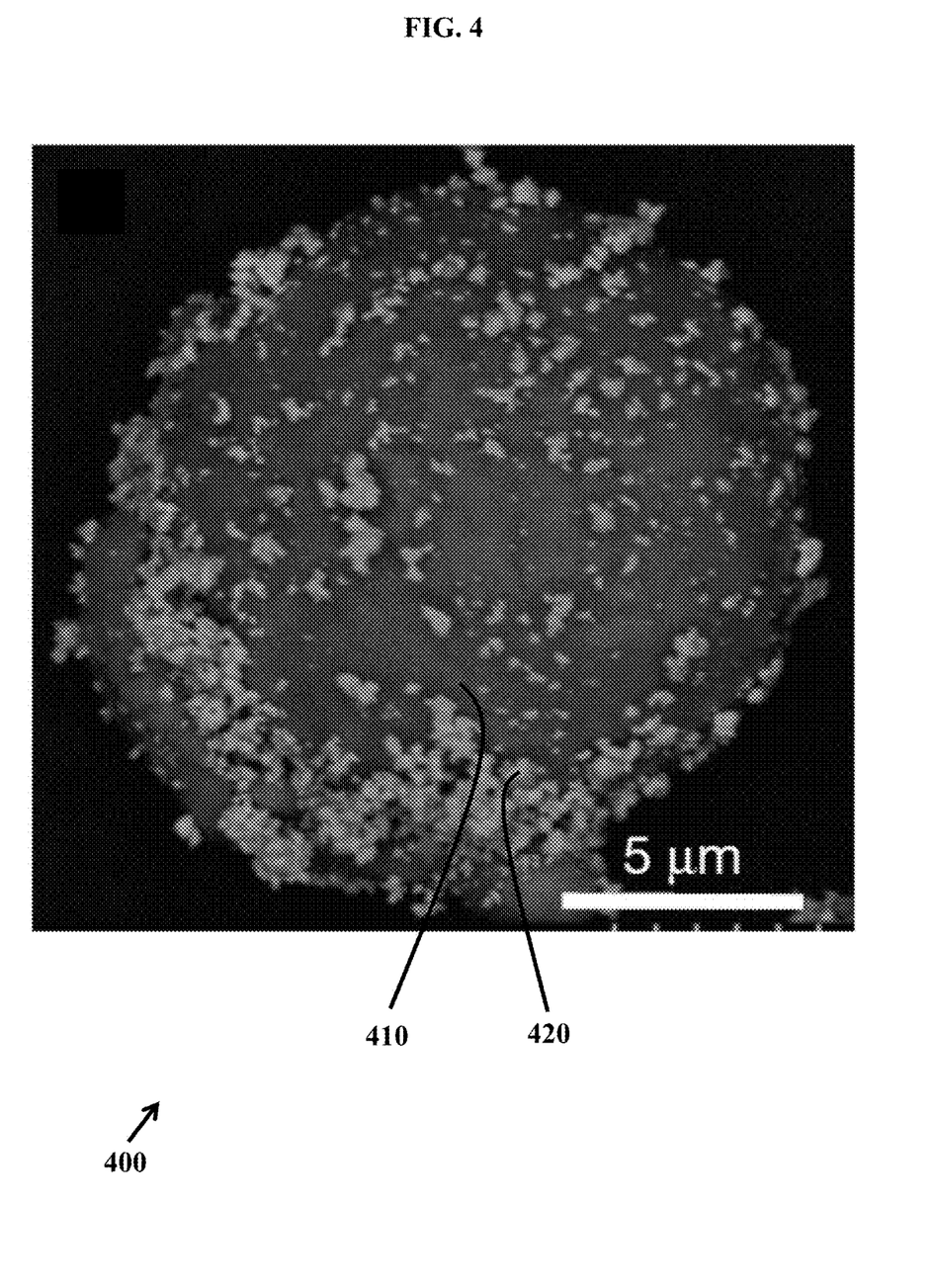
FIG. 4 is an SEM image of Al 7075 powder nanofunctionalized with WC (tungsten carbide) nanoparticles (scale bar 5 μm), in some embodiments.
Figure 5:
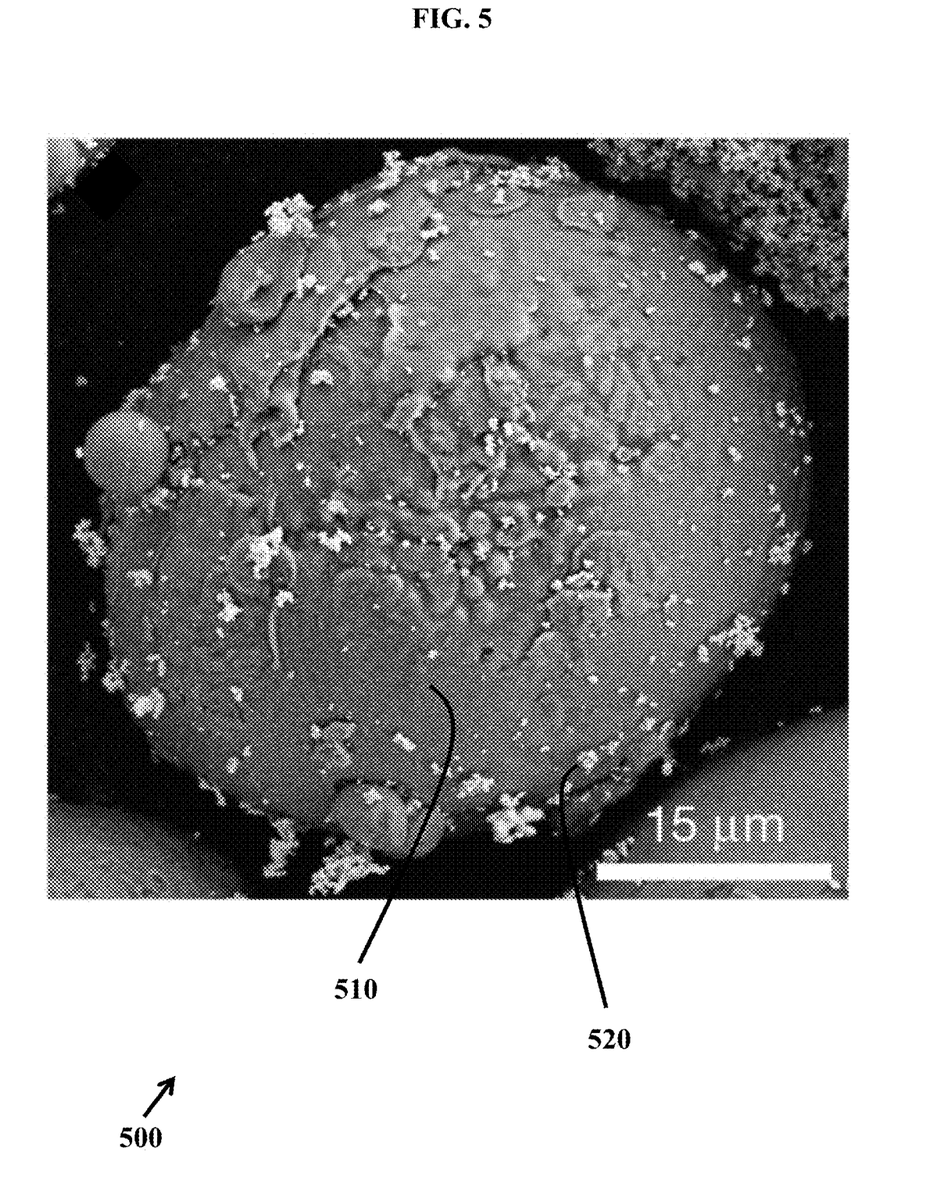
FIG. 5 is an SEM image of AlSi10Mg powder nanofunctionalized with WC nanoparticles (scale bar 5 μm), in some embodiments.

FIG. 3 is a scanning electron microscopy (SEM) image of Al 7075 powder 310 nanofunctionalized with discontinuous $TiB_2$ nanoparticles 320 (scale bar 5 μm), resulting in functionalized powder 300. FIG. 4 is an SEM image of Al 7075 powder 410 nanofunctionalized with discontinuous WC (tungsten carbide) nanoparticles 420 (scale bar 5 μm), resulting in functionalized powder 400. FIG. 5 is an SEM image of AlSi10Mg powder 510 nanofunctionalized with discontinuous WC nanoparticles 520 (scale bar 5 μm), resulting in functionalized powder 500.

Some embodiments of the present invention utilize materials, methods, and principles described in commonly owned U.S. patent application Ser. No. 15/209,903, filed Jul. 14, 2016, U.S. patent application Ser. No. 15/808,872, filed Nov. 9, 2017, U.S. patent application Ser. No. 15/808,877, filed Nov. 9, 2017, and/or U.S. patent application Ser. No. 15/808,878, filed Nov. 9, 2017, each of which is hereby incorporated by reference herein. This specification also hereby incorporates by reference herein Martin et al., "3D printing of high-strength aluminium alloys" Nature vol. 549, pages 365-369 and supplemental online content (extended data), Sep. 21, 2017, in its entirety.

While this disclosure is focused on metal powders, other embodiments are directed to functionalization of polymer particles, ceramic particles, glass particles, carbon particles, or mixtures of different materials.

Functionalized feedstocks may be powder feedstocks. As intended herein, "powder feedstocks" refers to any powdered metal, ceramic, polymer, glass, composite, or combination thereof. In preferred embodiments, the powder feedstocks are metals or metal-containing compounds, such as (but not limited to) Al, Mg, Ni, Fe, Cu, Ti, V, Si, or combinations thereof, for example.

The nanoparticles or microparticles are typically a different composition than the base powder. Nanoparticles or microparticles may include metals, ceramics, cermets, intermetallic alloys, oxides, carbides, nitrides, borides, polymers, carbon, and combinations thereof, for example, or other materials which upon processing form one or more of the aforementioned materials.

Generally speaking, the functionalized materials may contain one or more alloying elements selected from the group consisting of Si, Fe, Cu, Ni, Mn, Mg, Cr, Zn, V, Ti, Bi, Ga, Pb, or Zr. Other alloying elements may be included, such as (but not limited to) H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. These other alloying elements may function as grain refiners, as strength enhancers, as stability enhancers, or a combination thereof.

In some embodiments, the nanoparticles or microparticles contain one or more elements selected from the group consisting of zirconium, tantalum, niobium, titanium, and combinations, oxides, nitrides, hydrides, carbides, or borides thereof. As a specific example pertaining to zirconium, the zirconium may be present as Zr (x=0 to 4), i.e. in hydride form when x>0. An exemplary zirconium hydride is $ZrH_2$.

Powder particle sizes are typically between about 1 micron and about 1 millimeter, but in some cases could be as much as about 1 centimeter. The powdered feedstock may be in any form in which discrete particles can be reasonably distinguished from the bulk. The powder may be present as loose powders, a paste, a suspension, or a green body, for example. A green body is an object whose main constituent is weakly bound powder material, before it has been melted and solidified. The functionalized powder feedstocks may be converted into a geometric object, such as a wire, by controlling melting and solidification. The geometric object may itself be a functionalized precursor feedstock for another process, or may be a final part.

Powder particles may be solid, hollow, or a combination thereof. Particles can be made by any means including, for example, gas atomization, milling, cryomilling, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, particles within a powder feedstock are rod-shaped particles or domains resembling long sticks, dowels, or needles. The average diameter of the rod-shaped particles or domains may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual shape.

"Surface functionalization" refers to a surface modification on the powdered materials, which modification affects the solidification behavior (e.g., solidification rate, yield, grain quality, heat release, etc.) of the powder materials. In various embodiments, a powdered material is functionalized with about 1%, 2%, 5%, 10%, 15%, 20%, 25%, 30%, 40%, 50%, 60%, 70%, 80%, 85%, 90%, 95%, 99%, or 100% of the surface area of the powdered material having surface-functionalization modifications. The surface modification maybe a surface-chemistry modification, a physical surface modification, or a combination thereof.

In some embodiments, the surface functionalization includes a nanoparticle coating and/or a microparticle coating. The nanoparticles and/or microparticles may include a metal, ceramic, polymer, or carbon, or a composite or combination thereof. The surface functionalization preferably includes nanoparticles that are chemically or physically disposed on the surface of the powder materials.

Nanoparticles are particles with the largest dimension between about 1 nm and about 5000 nm. A preferred size of nanoparticles is about 2000 nm or less, about 1500 nm or less, or about 1000 nm or less. In some embodiments, nanoparticles are at least 50 nm in size. Microparticles are particles with the largest dimension between about 1 micron and about 1000 microns. The ratio of average particle size of microparticles to average particle size of nanoparticles may vary, such as about 1, about about $10^2$, about $10^3$, about $10^4$, or about $10^5$. In some embodiments, this ratio is from about 10 to about 1000.

The nanoparticle or microparticle size may be selected based on the desired final properties. Generally speaking, nanoparticles are preferred over microparticles for functionalization. However, references in this specification to nanoparticles should be understood to include embodiments in which microparticles are used in place of, or in addition to, nanoparticles.

Nanoparticles or microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter. The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the powder material particles.

Nanoparticles or microparticles may be attached using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

The nanoparticles may be generated ex situ, generated in situ, or a combination thereof. Ex situ generation of nanoparticles means that the nanoparticles are introduced to the powder surface already in the form of nanoparticles, from a prior step. In situ generation of nanoparticles means that nanoparticles are made from a precursor that has already been applied, or is continuously applied, to the powder surface, within the agitated pressure vessel. For example, nanoparticles may be generated in situ by pulse-wire discharge (wire explosion), solidification from a vapor phase containing nanoparticle precursors, vaporization followed by solidification, or other means.

Assembly aids may be incorporated. Assembly aids enhance the retention of nanoparticles on surfaces of the powder particles. In particular, assembly aids may enhance the chemical kinetics of nanoparticle assembly, the thermodynamics of nanoparticle assembly, or the diffusion or mass transport of nanoparticle assembly, for example. Assembly aids may be selected from the group consisting of surfactants, salts, dissolved ions, charged molecules, polar or non-polar solvents, hierarchically sized particulates, surface etchants for surface texture, and combinations thereof. For example, surfactants may reduce surface tension between nanoparticles and powder surfaces, resulting in better wetting and assembly. Salts or ions may alter the surface charge of the nanoparticles or powder surfaces, resulting in ionic bonds that enhance the assembly. Surface etchants may physically etch the surface of the powder to promote adsorption of nanoparticles.

The nanoparticles may be in the form of a monolayer, a multilayer, or less than one monolayer (e.g., from about 1% to 100% of one monolayer) and may be uniform or non-uniform at the powder surfaces. The exemplary materials shown in FIGS. 3 to 5 suggest non-uniform particles (discontinuous coating), forming less than one monolayer on average.

Nanoparticles may act as grain refiners to give a unique microstructure for a component ultimately produced from a nanofunctionalized metal powder as provided herein. In some preferred embodiments, therefore, the second particles include grain-refining nanoparticles. The grain-refining nanoparticles may be present in a concentration of at least 0.01 vol %, such as at least 0.1 vol %, at least 1 vol %, or at least 5 vol %. In various embodiments, the grain-refining nanoparticles are present in a concentration of about, or at least about, 0.1, 0.2, 0.5, 1, 2, 3, 4, 5, 6, 7, 8, 9, or 10 vol %. The concentration of the grain refiner(s) may be varied by adjusting the amount of grain refiners functionalized on the powder surface, and/or by adjusting the concentration of functionalized micropowders versus non-functionalized micropowders in the final material. Routine experimentation can be performed by a person of ordinary skill in the art to inform material selection and concentration for the grain-refining nanoparticles.

The number of nanoparticles per microparticle can vary widely. The average number of individual nanoparticles disposed on one microparticle (equivalently, the average number ratio of nanoparticles to powder microparticles) may be about 10, about $10^2$, about $10^3$, about $10^4$, about $10^5$, or about $10^6$, for example. The nanoparticle distribution on the powder particle surface can vary, as shown in FIGS. 3 to 5. In some embodiments, surface regions contain a relatively higher concentration of nanoparticles, which may be agglomerated at the surface in those regions.

The nanoparticle surface coverage may also vary widely, from about 1% to 100%, in various embodiments. The nanoparticle surface coverage is the average area fraction of powder particles that is covered by assembled nanoparticles. For example, the nanoparticle surface coverage may be about, or at least about, 1%, 5%, 10%, 20%, 30%, 40%, 50%, 60%, 70%, 80%, 90%, or 100%. Due to the small size of nanoparticles, benefits are possible with less than 1% surface area coverage.

The selection of the coating/powder composition will be dependent on the desired properties and should be considered on a case-by-case basis. Someone skilled in the art of material science or metallurgy will be able to select the appropriate materials for the intended use, based on the information provided in this disclosure.

In some embodiments, at least one nanoparticle is lattice-matched to within ±5% compared to powder feedstock without the nanoparticle. Preferably, the nanoparticle is lattice-matched to within ±2%, more preferably to within ±0.5%, compared to a powder feedstock without the nanoparticle.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, a functionalization coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underlying materials, the method of coating, reaction conditions, etc.

In some embodiments, microparticles (rather than nanoparticles) coat micropowders or macropowders. The micropowder or macropowder particles may include ceramic, metal, polymer, glass, or combinations thereof. The microparticles (coating) may include metal, ceramic, polymer, carbon, or combinations thereof. In the case of microparticles coating other micropowders or macropowders, functionalization preferably means that the coating particles are of significantly different dimension(s) than the base powder. For example, the microparticles may be characterized by an average dimension (e.g., diameter) that is less than 20%, 10%, 5%, 2%, or 1% of the largest dimension of the coated powders.

The materials and methods disclosed herein may be applied to additive manufacturing as well as joining techniques, such as welding. Certain unweldable metals, such as high-strength aluminum alloys (e.g., aluminum alloys Al 7075, Al 7050, or Al 2199) would be excellent candidates for additive manufacturing but normally suffer from hot cracking. The principles disclosed herein allow these alloys to be processed with significantly reduced cracking tendency. In particular, the nanofunctionalized metal powder may be converted to a metal alloy object through various means, such as additive manufacturing or other metal processing, wherein the metal alloy object is characterized by a unique microstructure.

A unique microstructure may be produced in a wide variety of alloy systems, as well as from metal processing beyond additive manufacturing. Incorporation of previously impossible concentrations and types of grain refiners is possible, in this disclosure, due to grain-refining elements being disposed on surfaces of base powder. This process utilizes functionalization to incorporate grain refiners directly at the site of melting, negating the need for expensive processing and making use of commercially available alloy powders. This technique is in contrast to incorporation of grain refiners into the internal regions of powder particles, which requires extremely high temperatures during gas atomization. Such high temperatures can cause volatility of certain alloying elements (including Zn, Mg, and Li), and can be damaging to equipment due to the high reactivity of some elements in metal alloys.

In some embodiments, a metal alloy microstructure (produced starting with a functionalized metal powder) is "substantially crack-free" which means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example. Large phase boundaries can also form inclusions. Note that these inclusions are different than the desirable nanoparticle inclusions that may form during additive manufacturing.

The metal alloy microstructure may be substantially free of porous defects, in addition to being substantially crack-free. "Substantially free of porous defects" means at least 99 vol % of the metal alloy contains no porous voids having an effective diameter of at least 1 micron.

Porous defects may be in the form of porous voids. Typically, a porous void contains open space, which may be vacuum or may contain a gas such as air, $CO_2$, $N_2$, and/or Ar. Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

In some embodiments, the metal alloy microstructure (produced starting with a functionalized metal powder) has "equiaxed grains" which means that at least 99 vol % of the metal alloy contains grains that are roughly equal in length, width, and height. In the metal alloy, crystals of metal alloy form grains in the solid. Each grain is a distinct crystal with its own orientation. The areas between grains are known as grain boundaries. Within each grain, the individual atoms form a crystalline lattice. Equiaxed grains result when there are many nucleation sites arising from grain-refining nanoparticles contained in the metal alloy microstructure.

The equiaxed grains, and reduction or elimination of cracks, in the final microstructure results from the presence of grain-refining nanoparticles in the initial functionalized metal powder (in powder form or other geometric form).

Some variations provide a solid metal alloy object comprising at least one solid phase (i) containing a functionalized powdered material as described, or (ii) derived from a liquid form of a functionalized powdered material as described. The solid metal alloy object may be a geometric object (e.g., wire or rod) that is useful for metal processing, instead of powder feedstock. The solid metal alloy object may be subjected to powder metallurgy processing techniques including, but are not limited to, hot pressing, low-pressure sintering, extrusion, metal injection molding, and additive manufacturing.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A system for producing a functionalized powder, said system comprising:
   (a) an agitated pressure vessel under an inert atmosphere and at a vessel pressure greater than atmospheric pressure;
   (b) a thermal-control unit disposed in thermal communication with said agitated pressure vessel;
   (c) a plurality of first particles contained within said agitated pressure vessel;
   (d) a plurality of second particles contained within said agitated pressure vessel, wherein said second particles are compositionally different than said first particles, and wherein said second particles are selected from the group consisting of zirconium hydrides, tantalum hydrides, niobium hydrides, titanium hydrides, and combinations thereof;
   (e) a fluid contained within said agitated pressure vessel;

(f) an exhaust line for releasing said fluid from said agitated pressure vessel; and (g) a means for recovering a functionalized powder directly from said agitated pressure vessel, wherein said functionalized powder contains said second particles disposed onto surfaces of said first particles, wherein said first particles have an average first-particle size from about 1 micron to about 1 millimeter; and wherein said second particles have an average second-particle size from about 1 nanometer to about 5000 nanometers.

2. The system of claim 1, wherein said fluid is non-flammable.

3. The system of claim 1, wherein said fluid is a liquid.

4. The system of claim 1, wherein said fluid is a gas.

5. The system of claim 1, wherein said fluid is selected from the group consisting of carbon dioxide, nitrous oxide, $C_1$-$C_4$ hydrocarbons, $C_1$-$C_4$ oxygenates, and combinations thereof.

6. The system of claim 5, wherein said fluid includes carbon dioxide in a vapor state and/or a liquid state within said agitated pressure vessel.

7. The system of claim 5, wherein said fluid includes carbon dioxide in a supercritical state within said agitated pressure vessel.

8. The system of claim 5, wherein said system comprises a means for introducing solid carbon dioxide into said agitated pressure vessel.

9. The system of claim 1, wherein said exhaust line includes a filter to capture said first particles, said second particles, and/or said functionalized powder.

10. The system of claim 1, said system further comprising a safety release line that is activated when the pressure within said agitated pressure vessel reaches a predetermined pressure.

11. The system of claim 1, said system further comprising a separate container disposed in flow communication with said exhaust line, for receiving fluid released from said agitated pressure vessel.

12. The system of claim 1, said system further comprising a control subsystem for adjusting temperature, pressure, residence time, and/or agitation within said agitated pressure vessel.

13. The system of claim 1, wherein said system is a batch apparatus.

14. The system of claim 1, wherein said system is a continuous or semi-continuous apparatus.

15. The system of claim 1, wherein said first particles are selected from the group consisting of metal particles, intermetallic particles, ceramic particles, and combinations thereof.

16. The system of claim 1, wherein said first particles contain one or more metals selected from the group consisting of aluminum, iron, nickel, copper, titanium, magnesium, zinc, silicon, lithium, silver, chromium, manganese, vanadium, bismuth, gallium, lead, and combinations thereof.

17. The system of claim 1, wherein said second particles are selected from the group consisting of metal particles, intermetallic particles, ceramic particles, and combinations thereof.

18. The system of claim 1, wherein said second particles contain one or more elements selected from the group consisting of zirconium, tantalum, niobium, titanium, and oxides, nitrides, hydrides, carbides, or borides thereof, and combinations of the foregoing.

19. The system of claim 1, wherein said agitated pressure vessel is disposed within an outer container.

* * * * *